United States Patent
Schmitt

[11] 3,757,094
[45] Sept. 4, 1973

[54] METHOD AND APPARATUS FOR COMPUTING GROUND SPEED IN AREA NAVIGATION COMPUTERS

[75] Inventor: Jerry C. Schmitt, Overland Park, Kans.

[73] Assignee: King Radio Corporation, Olathe, Kans.

[22] Filed: Apr. 19, 1971

[21] Appl. No.: 135,042

[52] U.S. Cl.......... 235/150.2, 235/150.26, 235/186, 343/112 C, 343/112 S
[51] Int. Cl............................................. G06g 7/78
[58] Field of Search.................... 235/150.2, 150.26, 235/150.27, 186, 189; 343/8–9, 106, 112 C, 112 S; 73/178 R; 318/581

[56] References Cited
UNITED STATES PATENTS

| | | | |
|---|---|---|---|
| 3,643,074 | 2/1972 | Hobbs | 235/150.27 |
| 3,534,399 | 10/1970 | Hirsch | 343/106 R X |
| 3,581,073 | 5/1971 | Visher | 343/112 C X |
| 3,414,901 | 12/1968 | Perkins et al. | 318/581 X |
| 3,090,958 | 5/1963 | Brown | 235/150.26 X |
| 3,377,470 | 4/1968 | Ausman | 235/150.26 |
| 3,118,059 | 1/1964 | Vago | 235/150.26 |

Primary Examiner—Charles E. Atkinson
Assistant Examiner—Jerry Smith
Attorney—Scofield, Kokjer, Scofield & Lowe

[57] ABSTRACT

An area navigation computer includes circuitry for computing aircraft ground speed to a waypoint. The ground speed of the aircraft relative to a VORTAC station is determined by information from a DME. Further, a means is provided for determining an angle defined as the included angle between the aircraft bearing to the associated VORTAC station and the aircraft bearing to the waypoint. The above-mentioned DME determined ground speed is then divided by the absolute value of the cosine of the included angle and the quotient is displayed in terms of aircraft ground speed with respect to the waypoint.

4 Claims, 2 Drawing Figures

METHOD AND APPARATUS FOR COMPUTING GROUND SPEED IN AREA NAVIGATION COMPUTERS

The subject device implemented method includes the steps of determining the ground speed of an aircraft relative to a VORTAC station, determining an angle defined as the included angle between the aircraft bearing to the VORTAC and the aircraft bearing to the waypoint, dividing the DME ground speed by the absolute value of the cosine of the angle, and displaying the quotient resulting from the dividing step in terms of aircraft ground speed with respect to the waypoint.

BACKGROUND AND BRIEF DESCRIPTION OF THE INVENTION

The computation of aircraft ground speed in an aircraft has heretofore been provided by the associated airborne DME with the operation of same being based on the rate of change of the distance from the aircraft to the ground VORTAC facility. This computed ground speed was useful information since most types of aircraft, following normal navigation procedures, were generally restricted by equipment limitation to flying radials of the VORTAC so that the aircraft's speed relative to the VORTAC was identical with its own course speed.

Area navigation equipment has obviated many of the conventional ground speed determining methods since aircraft utilizing such equipment now often fly courses other than the radials to the VORTAC. Stated another way, since the former methods of computing aircraft ground speed were based on the identity of a VORTAC radial with the aircraft course, the location of a waypoint (as contrasted to a VORTAC) and the corresponding aircrfat course with respect thereto results in the course speed to waypoint being possibly substantially different than the aircraft ground speed with respect to the VORTAC. This can be seen by referring to FIG. 1 wherein the distance $d3$ represents the distance between the aircraft and the waypoint and is also representative of the aircraft course. The distance $d1$ is representative of the distance between the aircraft and the VORTAC as measured by the airborne DME. Obviously, the rate of change of a distance $d1$ will be a very poor representation of the aircraft's ground speed on its course to the waypoint.

As suggested above, the prior art methods of computing ground speed to a waypoint generally called for the differentiation of the area navigation computed distance from the aircraft to the waypoint ($d3$). Such computation methods were similar to the prior art solutions of ground speed when the aircraft was flying a radial of the VORTAC facility. Area navigation computers, however, rely upon both DME distance and VOR bearing to compute the distance from the aircraft to the waypoint ($d3$) and the VOR bearing is generally highly susceptible to slight errors commonly referred to as VOR course scalloping or noise. Accordingly, the computed "distance to go" as represented by an electrical signal is difficult to maintain smooth and acceptable for differentiation purposes. Because of the additional noise sources in area navigation computers and in the "computed distance to go" the ground speed obtained by differentiation of that particular signal is generally unusable.

One of the principle objects of this invention is to provide a unique method and apparatus for computing ground speed of an aircraft to a waypoint utilizing area navigation computer information. It is a feature of this object that the subject method and apparatus are both less susceptible to the VOR course scalloping and other noise sources in the computer thereby permitting a pilot to have a more usable ground speed visually displayed.

Another object of the invention is to provide a unique method and apparatus for computing aircraft ground speed to a waypoint that utilizes the DME computed ground speed from an aircraft to a VORTAC and other area navigation computer information to modify the DME computed ground speed so that it equals the aircraft ground speed to waypoint along the aircraft course.

A further object of the invention is to provide an economical method and apparatus for modifying existing area navigation computer equipment or to be incorporated in area navigation computer equipment as same is being manufactured to more succinctly display aircraft to waypoint ground speed. Accordingly, a pilot is presented with more usable information and aircraft safety and estimated time of arrival are substantially enhanced.

Other and further objects of the invention, together with the features of novelty appurtenant thereto, will appear in the course of the following description.

DETAILED DESCRIPTION OF THE INVENTION

Figure 2:
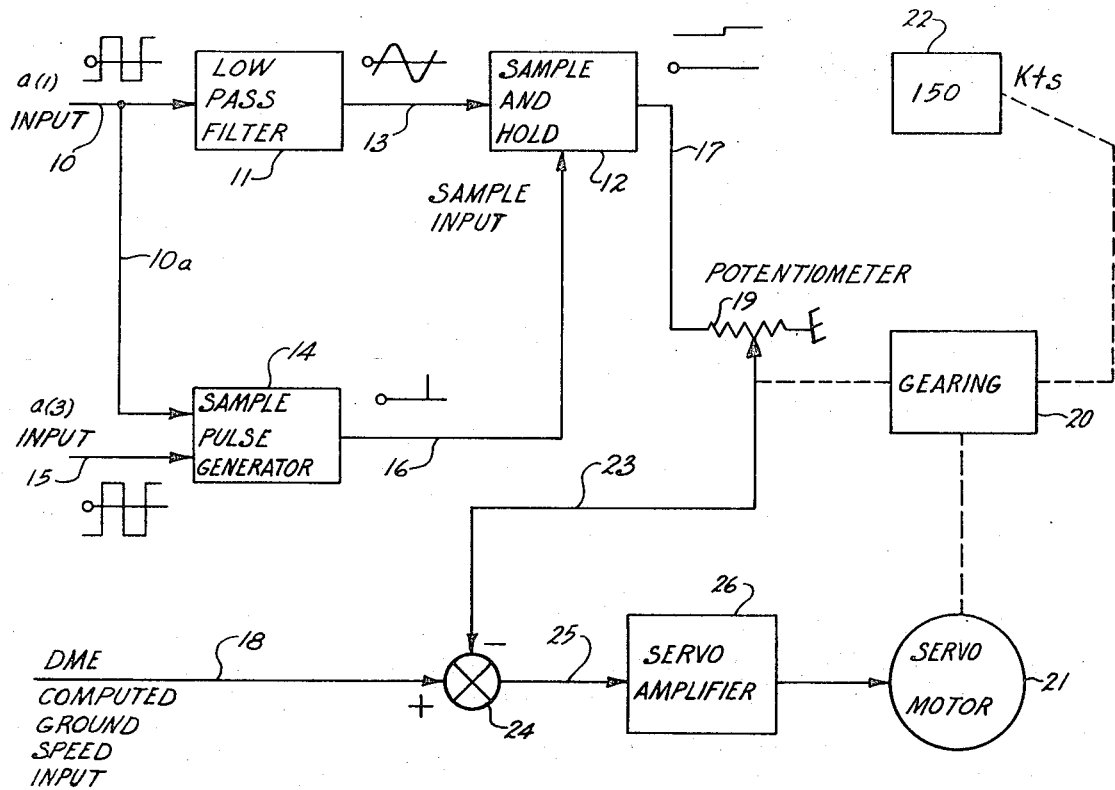
Figure 1:
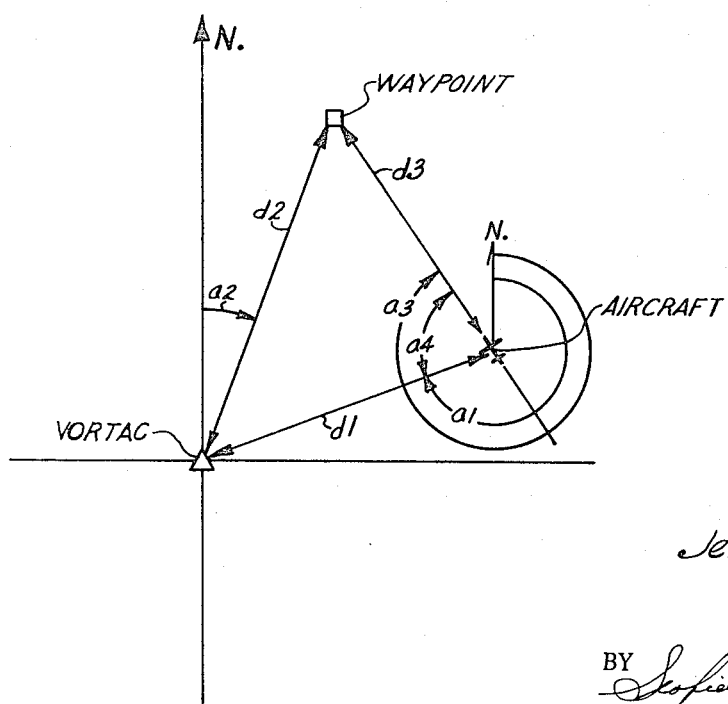

In the accompanying drawing, which forms a part of the specification and is to be read in conjunction therewith and in which like reference numerals are employed to indicate like parts in the various views:

FIG. 1 is a geometric representation of the area navigation problem solved by an area navigation computer including the various distances and angles that facilitate computation of ground speed of an aircraft with respect to the waypoint destination; and FIG. 2 is a block diagram of the circuitry for computing and visually displaying aircraft speed to the subject waypoint.

Turning now more particularly to FIG. 1, the aircraft location may be determined by the DME distance $d(1)$ and the VOR bearing indicated by the angle $a(1)$. $a(1)$ and $d(1)$ combine to form a vector from the aircraft to the VORTAC establishing the aircraft's position. Further, the normal operation of the area navigation computer requires a pilot input thereto which corresponds to the VORTAC to waypoint distance $d(2)$ and the VORTAC to waypoint bearing shown as the angle $a(2)$. Accordingly, $d(2)$ and $a(2)$ produce a vector from the VORTAC to the waypoint establishing the location of the latter. The final pilot input to the area navigation computer includes the desired course for the aircraft to follow to the waypoint and as such as designated by the angle $a(3)$. The computer now has sufficient information to compute the varying distance from the aircraft to the waypoint which is designated as $d(3)$.

As mentioned above, the various course deviation signals may be used by the pilot for navigation purposes even though the course error is assumed to be 0. This, however, does not mean that the aircraft must be on course to satisfactorily compute ground speed from the aircraft to the waypoint in accordance with the method and apparatus described, infra. I have found that sufficient information exists within area navigation computers to permit aircraft ground speed enroute to waypoint to be determined by the computer information and that when appropriately utilized, is not subject to the problems of noise and course scalloping. Since ground speed is always assumed to be positive whether the aircraft is flying toward or away from a waypoint, the DME ground speed, if divided by the absolute value of the cosine of the angle between the bearings $a(1)$ and $a(3)$, equalling angle $a(4)$ thereby results in a value equal to the aircraft ground speed enroute to the waypoint. The above mentioned DME ground speed which is used to compute the aircraft's ground speed enroute to the waypoint can be conventionally developed within the DME through various implementations which are art recognized concepts. Further, the DME ground speed is a stable and accurately determinable parameter. Accordingly, with the aircraft computed ground speed corresponds to a usable equation (eg., aircraft ground speed = DME ground speed/Cos $a(4)$) and as such is a function of the stability and accuracy of the DME computed ground speed along with the stability and accuracy of the cosine of the determinable angle $a(4)$. Computation of aircraft ground speed through implementation of the above-mentioned equation has the advantage of being less sensitive to errors caused by noise and VOR course scalloping even though the computation is made from available navigation signals within the area navigation computer.

An example of the improved stability may be seen by considering the following:

If the angle $a(4)$ were to change rapidly from 45° to 46° (as a result of the bearing error caused by VOR course scalloping), the ground speed computed by using the absolute value of the cosine of $a(4)$ would change only by about 2%. However, if the prior art methods of ground speed computation utilizing differentiation of the aircraft distance to waypoint as discussed earlier were used, the error is a function of how rapid the change from 45° to 46° occurred. Accordingly, errors may occur in the order of thousands of Kts. of ground speed.

As suggested above, it is possible to implement the aircraft ground speed equation based upon the available signals within area navigation computers. For example, it is well known that area navigation computers can produce signals whose relative phase represent magnitude of the angle $a(1)$ and the angle $a(3)$. Therefore, the angle $a(4)$ can be extracted by solution of the equation $(a)4=a(3)-a(1)$.

FIG. 2 diagrammatically represents my implementation for generating an analog voltage proportional to the absolute value of the cosine of the angle $a(4)$ and then performing the division of DME computed ground speed by this analog voltage.

Turning now to the utilization of the FIG. 2 circuitry, it can be assumed that there are two square wave signals available from the area navigation computer whose phases, relative to an arbitrary standard, respectively represent the angles $a(1)$ and $a(3)$. It should be understood, that other signals are also available, for example, both signals could be sine waves which are clipped to produce the desired square waves. However for simplification of representation, the two signals may be considered as suggested above. The $a(1)$ input signal on line 10 is first delivered to a low pass filter 11 which extracts the fundamental component without phase shift therefrom and delivers the filtered signal to a sample and hold circuit 12 via line 13. The line 10a likewise connects the signal $a(1)$ input to a sampling pulse generator 14. The second input to the sampling pulse generator 14 is the signal $a(3)$ input appearing on line 15. Sampling pulse generator 14 produces an output pulse for each zero crossing of the $a(3)$ signal input which occurs while signal $a(1)$ is positive. The sampling pulse produced by the generator 14 is then fed via line 16 to the sampling and hold circuit 12.

As suggested above, the sampling pulse on line 16 (output from generator 14) occurs only while the signal representing the angle $a(1)$ on line 10 is positive. Since the signal on line 13 is also positive, the output from the sample and hold network 12 will be positive. Therefore, the absolute value of the cosine of $a(4)$ [as opposed to the cosine of $a(4)$ with a variable sign] is extracted by the sample and hold circuit 12. Further, since the signal on line 13 is a cosine wave, the result of the sampling process is the desired cosine function.

FIG. 2 also shows a suitable embodiment for dividing the DME computed ground speed signal (present on line 18) by the absolute value of the cosine of $a(4)$ (appearing on line 17) by utilizing an electromechanical servo device. The division is performed by feeding the absolute value the cosine of the $a(4)$ signal to potentiometer 19. The arm of potentiometer 19 is mechanically coupled through conventional gearing 20 to digital counter wheels 22 (displaying ground speed) and to a servo motor 21. The above-mentioned gearing 20 and the digital counter wheel 22 in conjunction with the servo motor 21 permits the electrical output from the arm of potentiometer 19 to be appropriately displayed. The electrical output from the arm of potentiometer 19 (appearing on line 23) is subtracted in summing point 24 from the DME computed ground speed signal appearing on line 18. The resulting signal (on line 25) is amplified by servo amplifier 26 to drive servo motor 21.

Even though the above-described concept of displaying and utilizing results from two analog signals may possibly be implemented in other manners, this system has several advantages that are unique to division of DME computed ground speed by the absolute value of the cosine of $a(4)$. The importance of same is readily seen when it is noted that the cosine of $a(4)$ and the DME computed ground speed becomes a proportionally smaller number as the aircraft approaches the tangent point with a VORTAC facility. Since the electromechanical divider's gain, and therefore response, is proportional to the amplitude of the signal on line 17 representative of the cosine of $a(4)$, it can be seen that the displayed computed ground speed to the waypoint will become much more sluggish as the waypoint tangent is approached. In fact, as the aircraft is tangent to the VORTAC, the cosine value approximates 0 and the electromechanical divider ceases to respond to the input signals. Accordingly, the advantages of computing the aircraft ground speed to the waypoint are enhanced since the quality of input data reduces as the tangent point is approached but the corresponding reduction in divider's response becomes slower in order to extract as accurate an aircraft ground speed as possible.

From the foregoing, it will be seen that this invention is one well adapted to attain all of the ends of objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In an area navigation computer, including circuitry for computing aircraft ground speed to a waypoint, the improvement comprising;

DME means for determining the ground speed of said aircraft relative to a VORTAC station, said means further operable to produce an electrical signal which corresponds to the DME distance to said VORTAC, means for determining an angle defined as the included angle between the aircraft bearing to the VORTAC and the aircraft bearing to the waypoint, means for dividing a value corresponding to said DME distance electrical signal by the absolute value of the cosine of said included angle, and means for displaying the quotient of the dividing means in terms of aircraft ground speed with respect to said waypoint.

2. The combination as in claim 1 wherein said angle determining means includes a means for producing the absolute value of the cosine of said included angle as the electrical output thereof.

3. The combination as in claim 2 wherein said angle determining means includes a first input means having an electrical signal corresponding to the aircraft bearing to said VORTAC thereon, a second input means having an electrical signal corresponding to the aircraft bearing to said waypoint, filter means for filtering said electrical signal corresponding to said aircraft bearing to VORTAC, said filter being connected with said first input means and having an output, a sample and hold circuit said filter output interconnected with an input to said sample and hold circuit, and a sample pulse generator, said sample pulse generator connected with said first and second input means and operable to produce an output pulse when preselected conditions correspond to said bearing signals, said output from said sample pulse generator being transmitted to said sample and hold circuit thereby causing said sample and hold circuit to have an output corresponding to the absolute value of the cosine of the said included angle.

4. A device implemented method for computing aircraft ground speed to waypoint, said method comprising the steps of determining the ground speed of said aircraft relative to a VORTAC station by utilization of a DME, determining an angle defined as the included angle between the aircraft bearing to the VORTAC and the aircraft bearing to the waypoint, electrically representing the absolute value of the cosine of said included angle, electrically representing said DME distance, dividing said electrically represented DME distance by absolute value the cosine of said included angle, and displaying the quotient resulting from said dividing step in terms of said aircraft ground speed with respect to said waypoint.

* * * * *